Dec. 16, 1924.

Re. 15,966

G. S. MELCHER

PRESSURE REGULATOR

Original Filed Dec. 6, 1919 2 Sheets-Sheet 1

Inventor:
George S. Melcher, deceased,
by Fannie D. Melcher, Executrix,
by Merchant, Calver, Cofeland & Dike,
Attorneys.

Dec. 16, 1924.

Re. 15,966

G. S. MELCHER

PRESSURE REGULATOR

Original Filed Dec. 6. 1919 2 Sheets-Sheet 2

Inventor:
George S. Melcher, deceased.
by Fannie O. Melcher, Executrix.
by Meacham, Calver, Copeland & Dike,
Attorneys.

Reissued Dec. 16, 1924. Re. 15,966

UNITED STATES PATENT OFFICE.

GEORGE S. MELCHER, DECEASED, LATE OF SHARON, MASSACHUSETTS; BY FANNIE C. MELCHER, EXECUTRIX, OF SHARON, MASSACHUSETTS; SAID GEORGE S. MELCHER ASSIGNOR TO CHARLES W. McCONNEL, OF BOSTON, MASSACHUSETTS; ELDON MACLEOD, OF WESTWOOD, MASSACHUSETTS; AND FANNIE B. LOOK, OF NORTHAMPTON, MASSACHUSETTS, TRUSTEES, DOING BUSINESS AS MASON REGULATOR COMPANY.

PRESSURE REGULATOR.

Original No. 1,445,341, dated February 13, 1923, Serial No. 343,900½, filed December 6, 1919. Application for reissue filed June 7, 1923. Serial No. 644,082.

*To all whom it may concern:*

Be it known that GEORGE S. MELCHER, deceased, late of Sharon, in the county of Norfolk and State of Massachusetts, invented a certain new and useful Improvement in Pressure Regulators, of which the following is a specification, reference being had therein to the accompanying drawings.

This invention relates to boiler pressure regulators and has for its object a combination boiler pressure and draft pressure regulator by which the draft pressure is varied between predetermined limits at a given ratio relatively to any given variation in boiler pressure so that the proper draft to produce a maximum of efficiency with a minimum of coal consumption is at all times maintained. The device embodying the invention may be set for any boiler or battery of boilers and for any conditions under which the boiler or boilers are working, so that the air draft pressure will be varied at a definite ratio relatively to the boiler pressure between predetermined limits within which the boiler can be operated to the best advantage. Attempts have been made to govern the operation of the boiler pressure regulator in part by the air draft pressure, but such devices do not hold the air pressure between predetermined limits or do not vary it the proper amount for complete efficiency, but on the contrary tend merely to delay the action of the boiler pressure regulator and thereby tend to prevent the hunting or fluctuation of the regulative element. In devices heretofore constructed, if, for example, the steam pressure drops more than the range of compensation of the regulator due, for instance, to a sudden increase in load, the blower or other draft producer will be caused to produce a draft pressure which is greatly in excess of that required, thereby damaging the furnace fire. In the same way, where there is any variation in steam pressure, the proper air pressure is not maintained to produce the maximum efficiency. The device embodying the present invention is automatic in its operation and is arranged to properly regulate the air pressure for existing conditions and to prevent it from going beyond predetermined limits outside of which the air pressure should not go if proper combustion is to be obtained. In accordance also with one feature of the invention there is provided a pressure regulator having compensating mechanism for preventing unnecessarily violent operation of the device under sudden changes of pressure, which device is, nevertheless, delicate and quickly responsive in its action and particularly capable of use under very low pressures.

The invention will be fully understood by reference to the following description when taken in connection with the accompanying drawings, and the novel features thereof will be pointed out and clearly defined in the claims at the close of this specification.

In the drawings, Fig. 1 is a side elevation, partly in section of a device embodying the invention.

Figure 1:
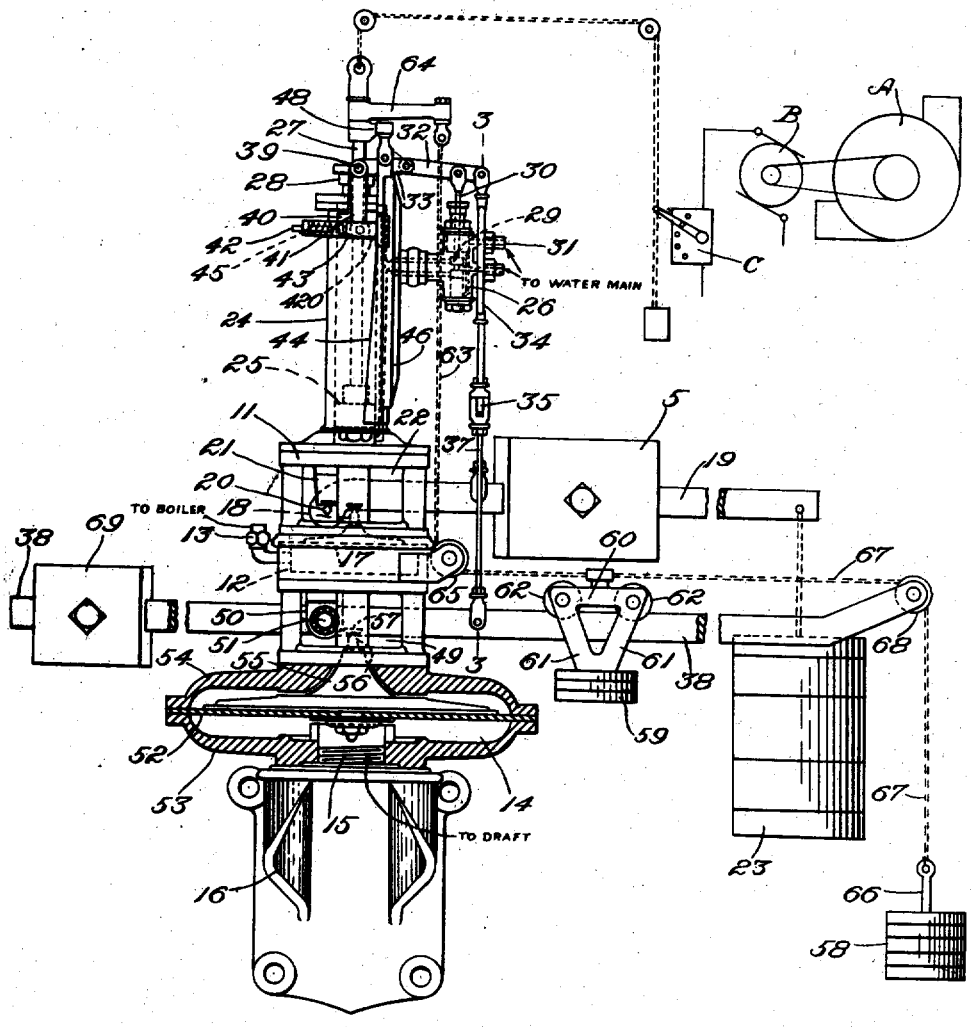
Figure 2:
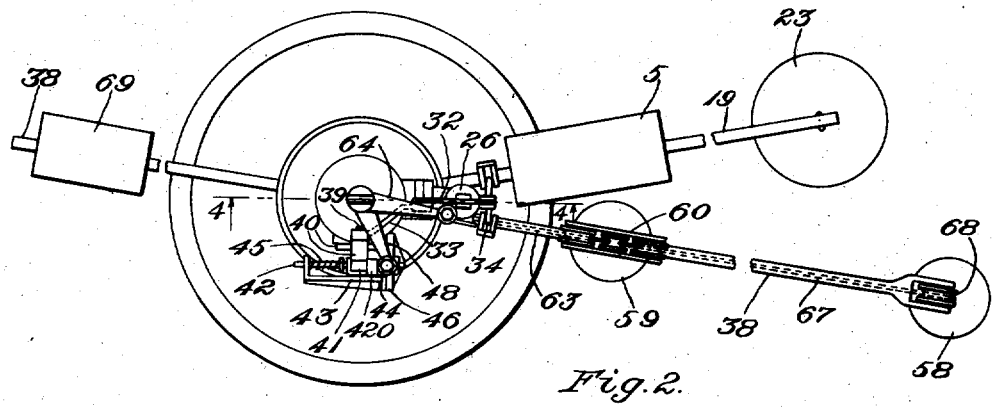
Fig. 2 is a top plan view of the device shown in Fig. 1.
Figure 3:
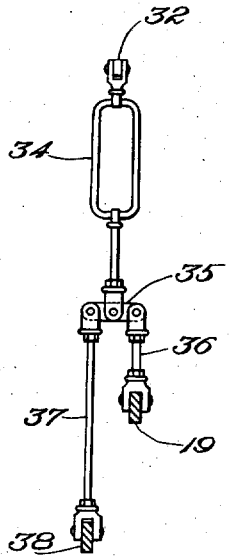
Fig. 3 is a section taken on line 3—3 of Fig. 1.
Figure 5:
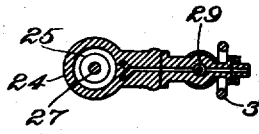
Fig. 5 is a section taken on the line 5—5 of Fig. 4.
Figure 4:
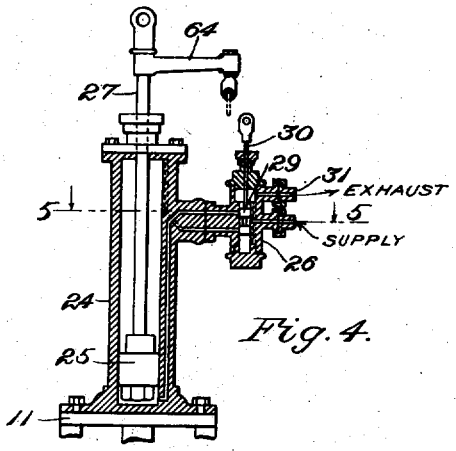
Fig. 4 is a section taken on the line 4—4 of Fig. 2.

Referring now to the drawings and particularly to Fig. 1, there is shown at A a draft producing device, as for instance, a blower. At B is shown a motor for operating said draft producing device, the motor in this case being an electric motor, and at C is shown a motor controlling element, in this case a rheostat. These parts are shown for the purpose of indicating one method of application of my device and it will be understood that the invention is not limited to the particular element shown, since it will be obvious that the device is equally applicable to other forms of motor elements and draft producing devices.

At 11 is shown a body having a diaphragm chamber 12 which is arranged to be connected with the boiler pressure by an inlet pipe 13. The body 11 is also provided with a diaphragm chamber 14 having an opening 15 for connection with the air draft, the whole being mounted on a suitable supporting bracket 16.

Within the boiler pressure diaphragm chamber 12 is a diaphragm 17 of any usual form which forms the upper wall of the chamber 12 so that it is subjected on one side to pressure therein. The upper face of the diaphragm 17 has the usual button and knife edge member 18, the latter of which engages with a lever 19 mounted in the upper portion of the body 11. The inner end of the lever 19 has a pair of studs 20 (only one of which is shown in Figure 1), each of which engage with fixed straps 21 between which the end of the lever 19 is received. The lever 19 extends through one of several openings 22 in the body 11 in a substantially horizontal position, the lever being provided with the usual weights 23 and 25. The diaphragm 17 is open to atmospheric pressure on the upper side, the weighted lever 19 being arranged to yieldingly resist the boiler pressure to which the lower surface of the diaphragm is subjected and to take part in the control of the draft mechanism. The diaphragm 17 constitutes the boiler pressure sensitive element.

A cylinder 24 is mounted on the body 11 and contains a piston 25 which is controlled by a pilot valve 26 and may be actuated by any medium, such as water under pressure from some suitable source, as for instance, the ordinary municipal water supply system. Secured to the piston 25 is a stem 27 which projects through a suitable stuffing box 28 in one end of the cylinder 24 and is adapted to be connected with the throttle of a fan engine, a motor or other draft producing device and a damper if desired.

The pilot valve 26 may be of any common form and is provided with a valve member 29 having a stem 30 which controls suitable passages to the ends of the cylinder 24, whereby fluid entering the pipe 31 is permitted to pass to the lower end of the cylinder 24 when the valve member 29 is moved up to cause the piston 25 to move up and to introduce fluid to the other end of the cylinder 24 when the valve member 29 is moved down to cause the piston 25 to be moved down. In the position shown in the drawings, the valve member 29 is in neutral position so that fluid is not permitted to enter the cylinder 24, and the piston 25 remains stationary. In the device as shown, the piston is moved down to open the throttle of the draft mechanism and is moved up to close it. It will be understood, however, that the invention is not limited to this construction, for any motor for controlling the throttle of the draft mechanism may be used.

The stem 30 of the valve member 29 is pivotally secured to a floating link 32, one end of which is pivotally connected to the arm 33 and the other end of which is pivotally connected to the upper end of a rod 34. The lower end of the rod 34 is pivoted to a floating link 35 at a point intermediate its ends, one end of which link is pivotally connected to a rod 36 which is in turn pivotally connected with the lever 19. The other end of the floating link 35 is pivotally connected to a rod 37 pivotally mounted on a lever 38, which, together with the lever 19, operates the valve member 29 in a manner hereinafter to be described.

The regulator hereinabove described is provided with a compensating mechanism, preferably of the type shown in the drawings. The compensating mechanism consists of the arm 33, referred to above, which is mounted on a shaft 39 journalled in a bracket 40 and carrying at its other end an arm 41. The arm 41 is connected with a rod 42 mounted in a guide 43 and having a head 420 which is held against a cam 44 by a suitable spring 45. The cam 44 is slidably mounted in a fixed guide 46 and is arranged to move with the stem 27, being connected with a horizontal arm 48 mounted on said stem. The compensating mechanism described produces a graduated action, so that the throttle of the draft producing mechanism has a finely graduated step by step movement, thereby preventing the full travel of the regulating element with each slight variation in pressure.

The lever 38 referred to above also operates the pilot valve in cooperation with the lever 19 in a manner which will now be described. The lever 38 projects through two opposite openings of the several openings 49 in the lower part of the body portion 11. The lever is received between a pair of fixed straps 50, and is provided with a cross shaft 51 which is mounted on ball bearings in each of the straps 50 as indicated. Below the lever 38 is the air pressure chamber 14, referred to above, the upper wall of which is formed by a diaphragm 52 which is suitably mounted between two cup-shaped members 53 and 54, respectively. The upper surface of the diaphragm is open to the atmosphere and is provided with the usual button 55 in which a knife edge member 56 is mounted. The knife edge member 56 engages with a suitable notch 57 in the lower side of the lever 38, so that pressure beneath the diaphragm 52 tends to move the lever about the pivotal point 51 against the pressure of weights 58 and 59 which will now be described. The diaphragm 52 forms the draft pressure sensitive element.

The weight 59 preferably consists of a plurality of metal disks which are carried on a carriage 60. The carriage consists of a pair of straps 61 which are hung on suitable rollers 62 adapted to run on the upper surface of the lever 38. It is attached to the piston stem 27 by means of a cord or chain 63 which is secured at one end to a horizontal arm 64 on the stem 27, passes around a pulley 65 mounted on the body 11, and is secured at its other end to the carriage 60, as shown. The weight 58 also preferably consists of a plurality of disks which are carried on a suitable rod 66. The rod 66 is attached to the carriage 60 by a chain 67 which passes over a pulley 68 on the end of the lever 38. The carriage 60 and attached parts constitute what may be termed, for convenience, the compensating mechanism. The other end of the lever 38 is preferably provided with a counter weight 69 which may be moved lengthwise of the lever, as desired, in order that the regulating mechanism may be adjusted, as will now be set forth in connection with the operation of the device.

The boiler pressure chamber 12 is connected with the boiler by means of the connection 13, so that the diaphragm 17 is subjected to it. The air pressure chamber 14 is connected with the draft pressure produced by the blower or like devices through the opening 15, so that the diaphragm 52 is subjected to the pressure in the air line. The device is adjusted to meet the requirements by means of the weights 69, 59 and 58. If, for example, a minimum draft pressure of one ounce is necessary and a maximum draft pressure of four ounces cannot be exceeded in order to produce the most efficient results, the weights are adjusted so that, when the weight carriage 60 is in the position shown in the drawings, the parts will be in balance when the diaphragm 52 is subjected to an air pressure of four ounces. The weights are also arranged so that, when the weight carriage 60 is at the inner end of its path of movement on the lever 38, the parts will be in balance when the diaphragm 52 is subjected to an air pressure of one ounce. The regulator is also adjusted for the pressure desired to be carried on the boiler. If, for example, one hundred and fifty pound boiler pressure is to be carried, the weights 5 and 23 are adjusted accordingly, so that at a pressure of one hundred and fifty pounds beneath the diaphragm 17 the parts will be exactly in balance.

When the desired boiler pressure is maintained, the weights 69, 59 and 58 are so adjusted that the weight carriage 60 is approximately at the centre of its path of movement on the lever 38, the parts being than in balance. If the desired boiler pressure is exceeded, the pressure beneath the diaphragm 17 raises the lever 19. The lever 19 raises the pilot valve member 29 through the rod 36, the floating link 35, the rod 34 and the floating link 32. The floating link 35 moves about the upper end of the rod 37 as a pivot and the floating link 32 moves around the free end of the arm 33 as a pivot. The valve stem 30 is accordingly moved outwardly by the fluid pressure under the control of the pilot valve, which actuates the piston as referred to above. The compensating mechanism is affected by the outward movement of the stem, the arm 41 being moved against its spring by the upward movement of the cam 44. The arm 33 is thus moved down slightly and the floating link 32 is moved about the end of the rod 34 as a pivot, with the result that the valve member 29 is lowered to neutral position and the parts remain in their new position until a further variation of steam pressure takes place. The upward movement of the piston stem 27, just described, closes the throttle of the draft producing mechanism an amount which depends upon the excess of boiler pressure over the pressure desired. The draft pressure is thus decreased. The amount of draft pressure reduction is controlled also by the diaphragm 52. When the main valve stem 27 moves up to show up the draft producing mechanism, the carriage 60 is drawn inwardly along the lever 38 and the resistance to the pressure beneath the diaphragm 52 is reduced. The parts are arranged so that the resistance is reduced an amount which is sufficient to carry the proper draft pressure to cause the steam pressure to come back to the desired point. If the draft pressure exceeds what is desired, the resistance offered by the weight carriage 60, in its new position, together with the weight 58 is not sufficient to balance the parts, so that the lever is lifted. The rod 37 is then moved upwardly and lifts the valve member 29 through the floating link 35, which acts about the upper end of the rod 36 as a pivot. The piston stem 27 is thus moved upwardly enough to decrease the draft pressure an amount which causes the pressure beneath the diaphragm 52 to equal the resistance above the diaphragm, thereby placing the parts in balance. The same thing is true if the draft pressure is less than that required, so that the furnace will not be cooled off too rapidly. In that case, the resistance offered by the weight is greater than the pressure beneath the diaphragm 52, so that the pilot valve member 29 is moved down slightly and the piston stem 27 is moved downwardly the proper amount to accelerate the draft producing apparatus enough to cause the proper draft pressure to be maintained. On the other hand, if the steam pressure in the boiler drops below the required amount, the draft is increased by an amount which is sufficient to efficiently return the steam pressure in the boiler to that for which the regulating apparatus is set.

The device is further adapted to limit the air pressure within the fixed range of variation within which the furnace may be efficiently operated. To illustrate this, we may suppose, for example, that the boiler pressure drops a substantial amount below normal, owing to a sudden increase of load or the like. Under the circumstances, the regulating lever 19 will at once lower the pilot valve member 29 and will open it wide if the pressure change is beyond the range of variation of the compensating mechanism. The main piston stem 27 will then be moved downwardly to open the throttle of the draft producing mechanism. When the piston stem 27 is in its downward position, the weight carriage 60 will be at the outer end of its path of movement on the lever 38 and in a position to offer the maximum of resistance to the pressure beneath the diaphragm 52, which is, for example, four ounces. The draft pressure will be immediately increased to four ounces and the lever 38 will be raised to horizontal position. The pilot valve member 29 will thus be raised by the rod 37, floating link 35, rod 34 and floating link 32 and brought to a neutral position. A further pressure caused by the draft producing mechanism will raise the lever 38 above the horizontal position and will lift the valve above its neutral position, thereby causing the piston 25 to move the stem 27 up and close down the throttle until the draft pressure is reduced to the maximum limit for which the device is set, namely, four ounces. In this way, the maximum pressure of four ounces is maintained until the boiler pressure is increased and arrives within the range of operation of the compensating mechanism, at which time the air draft pressure will be slowly reduced until the boiler pressure reaches its normal.

On the other hand, if the boiler pressure is suddenly increased by an amount which is greater than the range of variation of the compensating mechanism, the lever 19 will at once open the pilot valve member 29 and move the piston stem 27 to its upward position, thereby closing the draft mechanism to idling speed. The draft producing mechanism will remain at idling speed until the boiler pressure is reduced to within the range of variation of the compensating mechanism. When this occurs, the draft pressure will be gradually increased under the influence of both diaphragms, so that the proper draft pressure to hold the boiler pressure at normal is always maintained.

It will thus be seen that the boiler pressure sensitive element and draft pressure sensitive element act in conjunction with each other to produce the proper draft pressure to maintain the steam pressure at normal so long as the boiler pressure remains within the range of operation of the compensating mechanism; that if the boiler pressure exceeds normal pressure an amount which is greater than the range of operation of the compensating mechanism, the draft pressure is controlled entirely by the boiler pressure sensitive element, and is held at a minimum; and that if the boiler pressure drops below normal an amount which is greater than the range of operation of the compensating mechanism, the draft pressure is entirely controlled by the draft pressure sensitive element and is maintained at the maximum amount of draft pressure for which the device is set until the boiler pressure increases.

It will also be seen that the portion of the device which is responsive to the draft pressure can be made quite delicate in its operation, so as to be capable of use with very low pressures, such, for instance, as prevail in the draft passages of furnaces, notwithstanding the provision of compensating mechanism, including the travelling weight 59, for steadying the apparatus and preventing violent operation of the mechanism controlled under sudden changes in pressure. Compensating mechanism of this type, as heretofore constructed, has been limited to use in connection with relatively high pressures since, for its efficient operation, a considerable fixed minimum pressure is imposed upon the diaphragm 52 or equivalent pressure sensitive element by the travelling weight 59, its operating weight 58, and the mass of the relatively long lever arm 38. In the present construction, however, this fixed minimum pressure may be counterbalanced to any desired degree by the counterweight 69, thereby retaining all of the advantages of a compensating mechanism of this type, while rendering the apparatus responsive to pressures as low as may be desired.

What is claimed is:

1. The improved boiler pressure and draft control mechanism which consists of a fluid pressure motor for governing the furnace draft, a pressure sensitive element which is actuated by boiler pressure, a pressure sensitive element which is actuated by draft pressure, said elements being independent of each other, a single pilot valve for said motor, and means for operating said pilot valve by each of said pressure elements independently of each other and in conjunction with each other.

2. The improved boiler pressure and draft control mechanism which consists of a motor for governing the furnace draft, a pressure sensitive element actuated by boiler pressure, a pressure sensitive element actuated by draft pressure, independent elements actuated by each of said pressure sensitive elements, a control device for said motor, and a floating connection connecting said independent elements and said control device, by which each of said pressure sensitive elements may operate said control device independently of the other and in conjunction with each other.

3. The improved boiler pressure and draft control mechanism which consists of a motor for governing the furnace draft, a pressure sensitive element which is actuated by boiler pressure, a pressure sensitive element which is actuated by draft pressure, a control device for said motor, a member operatively connected with said control device, a pair of independent members one of which is operatively connected with one of said pressure sensitive elements, and the other of which is operatively connected with the other of said pressure sensitive elements, and a link operatively connected with each of said members and with said control device.

4. The improved boiler pressure and draft control mechanism which consists of a fluid pressure motor for governing the furnace draft, a pressure sensitive element which is subjected on one side to boiler pressure, and on the other side to a counteracting pressure, a second pressure sensitive element which is subjected on one side to draft pressure and on the other side to a counteracting pressure, means operated by said motor for increasing or decreasing the counteracting pressure on the second pressure sensitive element, a single pilot valve for said motor, and means for operating said pilot valve by each of said pressure sensitive elements independently of each other and in conjunction with each other.

5. The improved boiler pressure and draft control mechanism which consists of a motor for governing the furnace draft, a pressure sensitive element which is subjected on one side to boiler pressure and on the other side to a counteracting pressure, a second pressure sensitive element which is subjected on one side to draft pressure and on the other side to a counteracting pressure, means operated by said motor for increasing or decreasing the counteracting pressure on the second pressure sensitive element, a control device for said motor, a member operatively connected with said control device, a pair of members one of which is operatively connected with one of said pressure sensitive elements and the other of which is operatively connected with the other of said pressure sensitive elements, a link flexibly connected with said control device operating member, and at each side of each connection having a flexible connection with each of the members connected with said pressure sensitive elements.

6. The improved boiler pressure and draft control mechanism which consists of a motor for governing the furnace draft, a pressure sensitive element which is subjected on one side to boiler pressure and on the other side to a counteracting pressure, a second pressure sensitive element which is subjected on one side to draft pressure and on the other side to a counteracting pressure, means operated by said motor for increasing or decreasing the counteracting pressure on said second mentioned pressure sensitive element, a control device for said motor, a rod operatively connected to the control device, a link pivotally connected with said rod, and a pair of rods, one of which is operatively connected with one pressure sensitive element and the other of which is operatively connected with the other of said pressure sensitive elements, said last mentioned rods being pivotally connected to said link at each side of said control device operating rod.

7. In a device of the character described, and in combination with a motor for governing the furnace draft, a control device therefor, a pressure sensitive element actuated by boiler pressure, a second pressure sensitive element actuated by draft pressure, compensating mechanism acting on the draft pressure sensitive element, and means including connections between the compensating device and the control device whereby said pressure sensitive elements may operate said control device independently of each other and in conjunction with each other.

8. In a device of the character described, and in combination with a motor for governing the furnace draft, a control device therefor, a pressure sensitive element responsive to draft pressure, a second pressure sensitive element responsive to another varying condition of operation in the boiler, compensating mechanism acting on the draft pressure sensitive element, and connections between the compensating device and the control device, whereby said pressure sensitive elements may operate said control device independently of each other and in conjunction with each other.

9. In a device of the character described, and in combination with a motor for governing the furnace draft, a control device therefor, a diaphragm subjected to boiler pressure, a counteracting weight and lever acting thereon, a second diaphragm subjected to draft pressure, a counteracting lever acting thereon, a fluid pressure motor operating said control device, said motor having a piston, a pilot valve for said fluid pressure motor, a connection between the movable element of said pilot valve and both the boiler pressure balanced lever and the draft pressure balanced lever, a compensating weight movable longitudinally of one of said levers, and connections to the piston of said fluid pressure motor, whereby the position of the compensating weight on the said lever is varied by changes in position of the piston of the fluid pressure motor.

10. In a device of the character described, and in combination with a motor for governing the furnace draft, a control device therefor, a diaphragm subjected to boiler pressure, a counteracting weight and lever acting thereon, a second diaphragm subjected to draft pressure, a counteracting lever acting thereon, opposing weights on opposite sides of the point of application of the lever to the diaphragm, a fluid pressure motor operating said control device, said motor having a piston, a pilot valve for said fluid pressure motor and connections whereby said two diaphragms may act independently and also in conjunction with each other.

11. The improved boiler pressure and draft control mechanism which consists of a motor for governing the furnace draft, two pressure sensitive elements one of which is subjected to boiler pressure on one side and the other of which is subjected to draft pressure on one side, means for applying counteracting pressure to the side of each of said pressure sensitive elements opposite to that on which the boiler or draft pressure acts, a single pilot valve for said motor, means for operating said pilot valve by either of said pressure sensitive elements, and means operated by said motor for varying the counteracting pressure on one of said pressure sensitive elements.

12. The improved boiler pressure and draft control mechanism which consists of a motor for governing the furnace draft, two pressure sensitive elements one of which is subjected to boiler pressure on one side and the other of which is subjected to draft pressure on one side, means for applying counteracting pressure to the side of each of said pressure sensitive elements opposite to that on which the boiler or draft pressure acts, a single pilot valve for said motor, means for operating said pilot device by either of said pressure sensitive elements, and means operated by said motor for varying the counteracting pressure on the pressure sensitive elements which is subjected to draft pressure.

13. A pressure regulating mechanism comprising a pressure sensitive element subjected to a variable pressure, means for applying a variable counteracting pressure to said element, means controlled by said pressure applying means for controlling the pressure to be regulated, said controlling means being operatively connected with said pressure applying means to vary said counteracting pressure, and counterbalancing means for said pressure applying means to adapt said mechanism for operation under low pressures.

14. A pressure regulating mechanism comprising a pressure sensitive element subjected to a variable pressure, a lever for applying a counteracting pressure of constant minimum amount to said pressure sensitive element, means to counterbalance the effect of said lever, a weight of variable effectiveness for applying additional counteracting effect to said lever, means controlled by the lever for controlling the pressure to be regulated, and connections between said controlling means and weight for varying the effectiveness of said weight.

15. A pressure regulating mechanism comprising a pressure sensitive element subjected to a variable pressure, a lever opposing said element, a motor controlled by said lever, means operated by said motor for controlling the pressure to be regulated, a travelling weight on said lever at one side of the fulcrum thereof, said weight being connected with and controlled by said motor, and a counterweight on said lever at the opposite side of its fulcrum.

16. A pressure regulating mechanism comprising a lever, a pressure sensitive element subjected to a variable pressure and acting on said lever at one side of the fulcrum thereof to apply thereto a moment in one direction, means for applying to said lever a variable counteracting moment in the opposite direction, means for applying to said lever an additional moment in said first named direction, a motor controlled by said lever and operatively connected with said counteracting moment applying means to vary said counteracting moment, and means operated by said motor for controlling the pressure to be regulated.

17. A pressure regulating mechanism comprising a pressure sensitive element subjected to a variable pressure, a lever opposing said element, a motor controlled by said lever, means operated by said motor for controlling the pressure to be regulated, a travelling weight on said lever at one side of the fulcrum thereof, said weight being connected with said motor and moved thereby in one direction, a second weight connected with said travelling weight for moving the same in the opposite direction, and a third weight on said lever at the opposite side of its fulcrum.

In testimony whereof I affix my signature.

FANNIE O. MELCHER,
*Executrix of the will of George S. Melcher, deceased.*